United States Patent
Appelman

(10) Patent No.: US 7,519,559 B1
(45) Date of Patent: Apr. 14, 2009

(54) MESSAGING STAMP AUTHORITY

(75) Inventor: Barry Appelman, McLean, VA (US)

(73) Assignee: AOL LLC, Dulles, VA (US)

( * ) Notice: Subject to any disclaimer, the term of this patent is extended or adjusted under 35 U.S.C. 154(b) by 721 days.

(21) Appl. No.: 10/976,180

(22) Filed: Oct. 29, 2004

Related U.S. Application Data

(60) Provisional application No. 60/515,420, filed on Oct. 30, 2003.

(51) Int. Cl.
*H04L 9/00* (2006.01)

(52) U.S. Cl. .............................. 705/60; 713/170; 726/22

(58) Field of Classification Search .................... 726/22; 713/170; 705/60–64, 75; 283/71; 40/328, 40/616, 638
See application file for complete search history.

(56) References Cited

U.S. PATENT DOCUMENTS

| | | | |
|---|---|---|---|
| 5,327,486 A | 7/1994 | Wolff et al. | |
| 5,533,110 A | 7/1996 | Pinard et al. | |
| 5,557,659 A | 9/1996 | Hyde-Thomson | |
| 5,583,920 A | 12/1996 | Wheeler, Jr. | |
| 5,613,108 A * | 3/1997 | Morikawa | 707/200 |
| 5,793,365 A | 8/1998 | Tang et al. | |
| 5,872,917 A | 2/1999 | Hellman | |
| 5,878,219 A | 3/1999 | Vance, Jr. et al. | |
| 5,937,160 A | 8/1999 | Davis et al. | |
| 5,960,411 A | 9/1999 | Hartman et al. | |
| 5,999,967 A | 12/1999 | Sundsted | |
| 6,006,228 A | 12/1999 | McCollum et al. | |
| 6,012,051 A | 1/2000 | Sammon, Jr. et al. | |
| 6,014,638 A | 1/2000 | Burge et al. | |
| 6,026,403 A | 2/2000 | Siefert | |
| 6,104,990 A | 8/2000 | Chaney et al. | |
| 6,151,584 A | 11/2000 | Papierniak et al. | |
| 6,356,937 B1 | 3/2002 | Montville et al. | |
| 6,393,465 B2 | 5/2002 | Leeds | |
| 6,438,597 B1 | 8/2002 | Mosberger et al. | |
| 6,584,564 B2 | 6/2003 | Olkin et al. | |
| 6,640,301 B1 | 10/2003 | Ng | |
| 6,691,156 B1 | 2/2004 | Drummond et al. | |
| 6,697,462 B2 | 2/2004 | Raymond | |
| 6,714,982 B1 | 3/2004 | McDonough et al. | |
| 6,725,381 B1 | 4/2004 | Smith et al. | |
| 6,745,936 B1 | 6/2004 | Movalli et al. | |

(Continued)

FOREIGN PATENT DOCUMENTS

EP 0851335 A2 7/1998

(Continued)

OTHER PUBLICATIONS

"Network address translation" article from Wikipedia as published on Aug. 8, 2002 (3 pages) http://en.wikipedia.org/w/index.php?title=Network_address_translation&oldid=423718.*

(Continued)

*Primary Examiner*—Kimyen Vu
*Assistant Examiner*—Thomas Gyorfi
(74) *Attorney, Agent, or Firm*—Fish & Richardson, P.C.

(57) ABSTRACT

Electronic messages may be processed using a stamp authority by receiving an electronic message, identifying a stamp associated the message, determining if the stamp is valid, and, if the stamp is determined to be valid, distinguishing the message from messages with which a valid stamp is not identified.

26 Claims, 2 Drawing Sheets

U.S. PATENT DOCUMENTS

| | | | |
|---|---|---|---|
| 6,766,352 | B1 | 7/2004 | McBrearty et al. |
| 6,983,309 | B1* | 1/2006 | Yoshizawa ................ 709/206 |
| 7,380,126 | B2* | 5/2008 | Logan et al. ............... 713/176 |
| 2002/0052855 | A1 | 5/2002 | Landesmann |
| 2003/0023736 | A1 | 1/2003 | Abkemeier |
| 2004/0165707 | A1 | 8/2004 | Raymond |
| 2004/0199592 | A1* | 10/2004 | Gould et al. ............... 709/206 |
| 2004/0230531 | A1 | 11/2004 | Weiss |
| 2005/0086365 | A1 | 4/2005 | Urro |
| 2006/0041505 | A1* | 2/2006 | Enyart ........................ 705/40 |

FOREIGN PATENT DOCUMENTS

| | | |
|---|---|---|
| EP | 0982927 A1 | 3/2000 |

OTHER PUBLICATIONS

"E-Stamps", by Brad Templeton, 14 pages http://web.archieve.org/web/20030430074648/http://www.templetons.com/brad/spam/estamps.html "Spam blocker charges for e-mail", by Declan McCullagh, Cnet News, Feb. 20, 2003, http://news.com.com/2102-1023_3-985175.html, 2 pages.

"Want to stop spammers? Charge 'em", by Declan McCullagh, Cnet News, May 5, 2003 http://att.com.com/2102-1071_3-999561.html, 3 pages.

"Canning Spam: An Economic Solution to Unwanted Email", by Sonia Arrison, Feb. 2004, Pacific Research Institute, 23 pages.

"Selling interrupt rights: A way to control unwanted e-mail and telephone calls", by Scott E. Fahlman, IBM Systems Journal, vol. 41, No. 4, 2002, pp. 759-766.

"When You're Gagging on E-Mail", by Michael Rothschild, Forbes ASAP, Jun. 1994, http://www.bionomics.org/text/resource/articles/ar_014.html, Jun. 1994, 3 pages.

"Unlovely Spam", by Michael W. Lynch, Reason Magazine, Oct. 1997, http://reason.com/9710/col.lynch.shtml, 6 pages.

Martin Abadi et al.: "Bankable Postage for Network Services", Copyright 2003, Springer-Verlag, pp. 1-20.

Cynthia Dwork et al.: "Common Misconceptions About Computational Spam-Fighting", Internet Document, [Online] pp. 1-2, Retrieved from the Internet: http://research.microsoft.com/research/sv/PennyBlack/spam-com.html, [retrieved on Oct. 29, 2004].

Brad Templeton: "Essays on Junk E-mail (Spam)", Internet Document, [Online] pp. 1-2, Retrieved from the Internet: http://www.templetons.com/brad/spam/, [retrieved on Oct. 29, 2004].

Brad Templeton: "E-Stamps", Internet Document, [Online] pp. 1-13, Retrieved from the Internet: http://www.templetons.com/brad/spam/estamps.html, [retrieved on Oct. 29, 2004].

Cynthia Dwork: "Fighting Spam May Be Easier Than You Think", Microsoft Research SVC, pp. 1-44.

Scott Hazen Mueller: "Fight Spam on the Internet!", Internet Document, [Online] pp. 1-5, Retrieved from the Internet: http://spam.abuse.net/, [retrieved on Oct. 29, 2004].

Randy Cassingham: "Getting Rid of "Spam"", Internet Document, [Online] Copyright 1996-2004, ThisIsTrue,inc., pp. 1-3, Retrieved from the Internet: http://www.spamprimer.com, [retrieved on Oct. 29, 2004].

Adam Back: "Hashcash—A Denial of Service Counter-Measure", Aug. 1, 2002, pp. 1-10.

Anonymous: "Junkbusters", Internet Document, [Online] p. 1, Retrieved from the Internet: http://www.junkbusters.com/index.html, [retrieved on Oct. 29, 2004].

Adam Back: "New Site—hashcash.org", Internet Document, [Online] pp. 1-4, Retrieved from the Internet: http://www.cypherspace.org/adam/hashcash/, [retrieved on Oct. 29, 2004].

Mike Burrows et al.: "No Spam At Any (CPU) Speed", Internet Document, [Online] Microsoft Research—Silicon Valley, p. 1, Retrieved from the Internet: http://research.microsoft.com/research/sv/PennyBlack/demo/index.html, [retrieved on Oct. 29, 2004].

Cynthia Dwork et al.: "On Memory-Bound Functions for Fighting Spam", Microsoft Research SVC, pp. 1-17.

Cynthia Dwork: "On the Computational Approach to Fighting Spam", Microsoft Research SVC, pp. 1-31.

Anonymous: "How To Deal With Unwanted Calls & Do-Not-Call Registries", Internet Document, [Online] Copyright 2000-2003, Avinta Communications, pp. 1-9, Retrieved from the Internet: http://www.avinta.cim/products-1/uwc/UwcChart/uwcChart.htm, [retrieved on Oct. 29, 2004].

Scott E. Fahlman: "Spam and Telemarketing", Internet Document, [Online] pp. 1-9, Retrieved from the Internet: http://www-2.cs.cmu.edu/~sef/spam-discussion.htm, [retrieved on Oct. 29, 2004].

David Mertz: "Spam Filtering Techniques", Internet Document, [Online] Analyzer, Gnosis Software, Inc., Sep. 1, 2002, pp. 1-6, Retrieved from the Internet: http://www-106.ibm.com/developerworks/linux/library/1-spamf.html?t=gr,Inxw15=SFT, [retrieved on Oct. 29, 2004].

Scott E. Fahlman: "Technical Forum", Copyright2002, International Business Machines Corporation, IBM Systems Journal, vol. 41, No. 4, pp. 759-766.

Andrew Birrell et al.: "The Penny Black Project", Internet Document, [Online] Copyright 2004, Microsoft Corporation, pp. 1-2, Retrieved from the Internet: http://research.microsoft.com/research/sv/PennyBlack/, [retrieved on Oct. 29, 2004].

Anonymous: "Way to Pay", Internet Document, [Online] Copyright 1999-2004, PayPal, pp. 1-2, Retrieved from the Internet: http://www.paypal.com/.

"AOL technology: turning complicated things into engaging services", 1996 Annual Report, 22 pages.

"Yahoo! Messenger Makes the World a Little Smaller, More Informed", pp. 1-2, Jun. 21, 1999.

Alan Cohen, "Instant Messaging", Apr. 13, 1999, PC Magazine, PC Labs, 2 pages.

"AOL Instant Messenger Windows Beta Features", Jun. 24, 1999, 2 pages, AOL Instant Messenger All New Version 2.0, 2 pages, Jun. 24, 1999, What is AOL Instant Messenger, 3 pages, Jun. 24, 1999, Quick Tips for Getting Started, 5 pages, Jun. 24, 1999, Frequently Asked Questions About AOL Instant Messenger, 6 pages, Jun. 24, 1999.

* cited by examiner

MESSAGING STAMP AUTHORITY

CROSS-REFERENCE TO RELATED APPLICATIONS

This application claims priority to U.S. Provisional Application No. 60/515,420, entitled "Internet Stamp Authority", and filed Oct. 30, 2003.

TECHNICAL FIELD

This disclosure relates to electronic messaging.

BACKGROUND

Pervasive communications networks are being used to exchange ever-increasing numbers of communications. These communications may include electronic mail messages and instant messages.

DETAILED DESCRIPTION

The low cost of exchanging electronic mail messages allows an Internet-based messaging system to easily exchange large numbers of messages to large numbers of users. The ability to send large numbers of messages at a low cost is used by marketers and others to send unsolicited and/or unwanted electronic mail messages (e.g., SPAM). Many users receive a tremendous amount of SPAM. In fact, a user often may receive so much SPAM that that a user is required to dedicate significant amounts of time deleting the SPAM in order to manage the user's 'inbox.' When barraged by SPAM, users therefore often experience frustration and otherwise perceive a poor user experience. The poor user experience may lead a user to frequently change Internet Service Providers (ISPs) and/or online identities (e.g., screen names or electronic mail addresses), and/or to reduce reliance upon electronic mail messaging.

The above and other issues may be avoided by reducing the volume of unwanted electronic mail messages using a stamp authority designed to impose a transaction cost to be borne by senders of electronic mail messages. One implementation of the stamp authority includes a receiving host that rejects or distinguishes received electronic mail messages that do not include a valid stamp. Thus, a transmitting party is incentivized to include a stamp with its electronic mail messages, thus ensuring that the receiving host will process its electronic mail messages and make them accessible to a destination client. The stamp authority effectively increases the transaction cost associated with effectively sending an electronic mail message, leading to a decrease in the volume of SPAM. Transmitting parties may continue to send electronic mail messages without stamps, but the receiving host may reject or otherwise distinguish/label/characterize unstamped electronic mail messages.

A stamp authority may limit (e.g., rate limit or volume limit) a number of stamps allocated to a party seeking to send electronic mail messages (e.g., a transmitting client). Thereafter, the party seeking to send an electronic mail message may associate a stamp with each message or each group of messages. For example, stamp identification information may be appended to the header of the electronic mail message. A host receiving the electronic mail message may receive the electronic mail message and identify a stamp associated with the electronic mail message. The receiving host determines if the stamp is valid, for example, by polling a stamp authority. When the stamp is valid, the electronic mail message is made available in a user's inbox. When the stamp is invalid or when a stamp is not included in an electronic mail message, the electronic mail message may be rejected, or otherwise visually or logically distinguished from "stamped" messages (e.g., the unstamped message may be placed in a folder for messages that are unstamped and may include SPAM).

Figure 1:
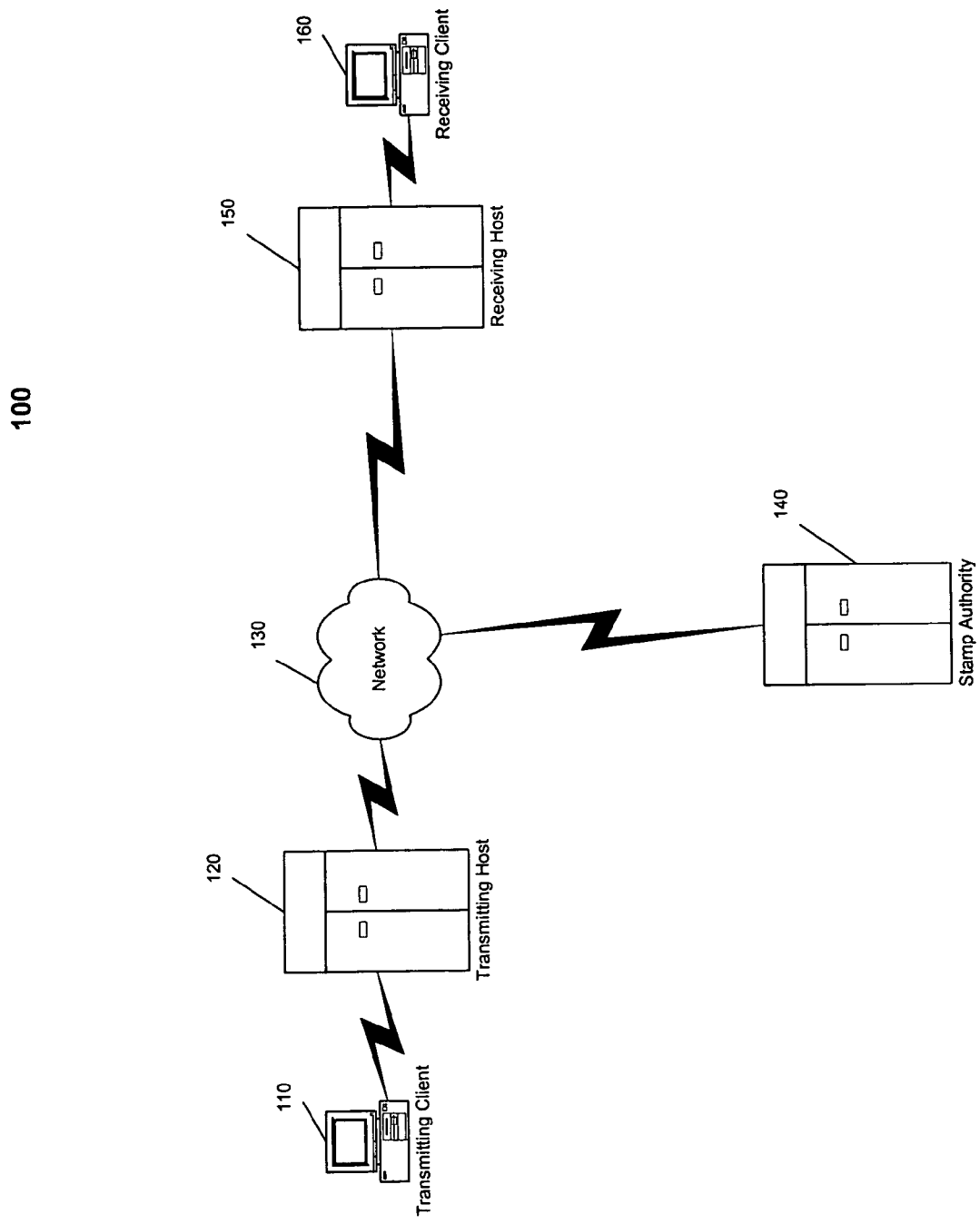
FIG. 1 is a block diagram of an exemplary communications system configured to exchange electronic mail messages using a stamp authority.

FIG. 1 illustrates an exemplary block diagram of a communications system 100 configured to exchange electronic mail messages using a stamp authority. In particular, a transmitting client 110 may generate electronic mail messages that are sent by the transmitting host 120. The electronic mail messages may be associated with stamps issued or regulated by the stamp authority 140. The transmitting host 120 is configured to exchange the electronic mail messages across the network 130 with the receiving host 150. The receiving host 150 is configured to process and receive electronic mail messages using the stamp authority 140 so that the receiving client 160 may receive the electronic mail messages.

Generally, each of the systems shown in communications system 100, such as the transmitting client 110, the transmitting host 120, the stamp authority 140, the receiving host 150, and the receiving client 160 may be implemented by a computer system configured to execute instructions in a predetermined manner.

Each of these systems may be implemented by, for example, a general-purpose computer capable of responding to and executing instructions in a defined manner, a personal computer, a special-purpose computer, a workstation, a server, a device, a component, other equipment or some combination thereof capable of responding to and executing instructions. These systems may be structured and arranged to receive instructions from, for example, a software application, a program, a piece of code, a device, a computer, a computer system, or a combination thereof, which independently or collectively direct operations, as described herein. The instructions may be embodied permanently or temporarily in any type of machine, component, equipment, storage medium, or propagated signal that is capable of being delivered to these systems.

The transmitting client 110 includes a device configured to allow a user to generate an electronic mail message. The transmitting client 110 may include one or more messaging applications that allow a user to operate an electronic mailbox used to administer a system for sending and receiving electronic mail messages. Examples of the messaging applications may include a messaging application integrated into an online service provider client such as the AOL client. Other examples of the messaging application may include a web browser configured to enable access to an electronic mailbox accessible through a web server, a messaging application (e.g., Microsoft Outlook), or a server (e.g., an Exchange server).

The messaging application may include a stamp agent configured to associate a stamp with electronic mail messages. For example, the messaging application may include an "insert stamp" button in a messaging graphical user interface (GUI). When the transmitting client 110 receives an insert stamp instruction (e.g., when an "insert stamp" button is pressed), a stamp transaction may be executed. Fr example, a stamp may be associated with the electronic mail message. In one implementation, a stamp counter indicating a number of electronic mail messages that may be exchanged is decremented each time a message is sent. In another example, the transmitting client 110 may initiate a transaction that assesses a financial cost against a user account each time a message is sent.

A user of the messaging application on the transmitting client 110 need not be aware that a stamp has been included, or even whether a stamp system is being used. For example, the messaging application may seamlessly interface with a stamp authority 140 to associate a stamp with an electronic mail message if a stamp is available.

The transmitting host 120 includes a messaging device configured to receive instructions to transmit electronic mail messages from a transmitting client 110, and to transmit an electronic mail message as specified by the transmitting host 120. For example, the transmitting host 120 may receive a message from the transmitting client 110 generated in a messaging application and transmit the message using the network 130 to a receiving host 150 using SMTP ("Simple Mail Transfer Protocol") packets.

The transmitting host 120 may be configured to associate a stamp with an electronic mail message. In one implementation, the transmitting host 120 is configured to retrieve a stamp identifier from the stamp authority 140 and to associate the stamp identifier with the electronic mail message. In another implementation, the transmitting host 120 is configured to upload information related to the electronic mail message to the stamp authority 140 so that the receiving host 150 may reference the uploaded information in determining if the stamp for a received electronic mail message is valid.

The network 130 includes hardware and/or software capable of enabling direct or indirect communications between the transmitting host 120, the stamp authority 140, and the receiving host 150. As such, the network 120 may include a direct link between these systems, or it may include one or more networks or subnetworks between them (not shown). Each network or subnetwork may include, for example, a wired or wireless data pathway capable of carrying and receiving data. Examples of the network include the Internet, the World Wide Web, a WAN ("Wide Area Network"), a LAN ("Local Area Network"), analog or digital wired and wireless telephone networks, radio, television, cable, satellite, and/or any other delivery mechanism for carrying data.

The stamp authority 140 includes a device configured to generate, enable access to, associate, and validate one or more stamps used in exchanging electronic mail messages. The stamp authority 140 may enable a transmitting client 110 and/or the transmitting host 120 to associate a stamp with an electronic mail message that will be sent. In one implementation, the stamp authority 140 is configured to associate a stamp using information related to the electronic mail message, the identity of the user transmitting the electronic mail message (e.g., legal name, screen name, electronic mail address, or domain name of the transmitting host), the identity of one or more intended recipients, or the identity of one or more organizations associated with the transmitting client 110. There may be competing but interoperable stamp authorities that exchange information to allow electronic mail messages associated with stamps from the different stamp authorities to be exchanged.

The stamp authority 140 may be configured to associate a stamp in a secure manner. For example, the stamp may be encrypted using a public key system that limits the ability of the stamp to be read to those stamp authorities possessing the related private key.

The stamp authority 140 may be configured to maintain a stamp accounting system that tracks how a stamp has been used. For example, the stamp authority 140 may maintain a list of user identities or e-mail servers or domains with which the stamp authority has a relationship. The stamp authority 140 may include a meter that tracks the usage per user identity. The meter may work in conjunction with usage restrictions that regulate how the stamp authority may provide stamp services in support of the user identity. For example, a user identity may receive a daily allotment of stamps (e.g., five stamps) enabling an electronic mail message account associated with the user identity to send up to the daily allotment of "stamped" electronic mail messages. When the daily allotment has been exhausted, the messaging application in the stamp authority 140 may be configured to allow the user identity to acquire additional stamps. For example, the user identity may purchase additional stamps, or to receive additional stamps given by another user identity. In another example, the stamp authority 140 may generate an interrogation request for the transmitting host 120 to analyze the profile of the electronic mail messages sent by the user identity. If the profile reveals that the electronic mail messages are not likely to be SPAM, the stamp authority 140 may provide additional stamps.

The stamp authority 140 may provide stamp services for an organization such as an online service provider or a company. The stamp authority 140 may be configured to allocate a limited number of stamps across multiple user identities supported by the stamp authority. Thus, a company may be allocated a specified number of stamps per month. A first user may be allowed more than their proportional share of stamps so long as the company has stamps available.

The stamp authority 140 may form part of a hierarchical stamp authority structure or may be operated in a distributed stamp authority environment. In a hierarchical stamp authority structure, a stamp authority may be configured to provide stamp authority services for a limited portion of the organization. A "junior" stamp authority may answer stamp authority requests received from a "senior" stamp authority. The senior stamp authority may be configured to act as a stamp authority 140 with respect to external systems. To validate a stamp, the senior stamp authority receives the request and routes the validation request "downwards" to the appropriate junior stamp authority. The junior stamp authority then responds to the request and reports the result to the senior stamp authority, which in turn responds to the request.

In a distributed stamp authority environment, different and independent stamp authorities may be configured to issue stamps to subscriber user identities and/or organizations. When an electronic mail message is exchanged with a receiving host 150 using a different stamp authority, a first stamp authority used by the receiving host 150 may interface with a second stamp authority used by the transmitting host 120. In one implementation, the first stamp authority is configured to query the second stamp authority to determine if the stamp is valid. In a second implementation, the first stamp authority is configured to maintain a balance of stamp transactions. For example, the first stamp authority may be configured to track the number of stamp transactions that have been processed for other stamp authorities and the number of stamp transactions that other stamp authorities have provided on behalf of the first stamp authority. In the event that an imbalance is maintained over an extended period of time, the first stamp authority may be configured to settle the balance as a financial transaction. When the stamp services have been provided on behalf of the first stamp authority, the first stamp authority may reimburse the other stamp authorities. The first stamp authority may receive credits for the stamp services provided for other stamp authorities.

The receiving host 150 may include an electronic mail messaging system configured to receive electronic mail messages from a transmitting host 120. The receiving host 150 then may store the received electronic mail messages in an inbox or file system accessible to the receiving client 160.

The receiving host 150 may be configured to interface with a stamp authority 140 in deciding whether to receive an electronic mail message. The receiving host 150 may be configured to identify a stamp associated with an electronic mail message and poll the stamp authority 140 to determine if the stamp is valid. The receiving host 150 then may be configured to process electronic mail messages determined to be valid, while rejecting electronic mail messages determined to be invalid.

The receiving client 160 may include a device used to manage and administer an electronic mailbox used to send and receive electronic mail messages. The receiving client 160 may include the electronic mail messaging applications described previously with respect to the transmitting client 110. In fact, the transmitting client 110 and the receiving client 160 may include identical or different electronic mail messaging software. However, the receiving client 160 may receive electronic mail messages using a different feature set than the feature set used in transmitting an electronic mail message. For example, the receiving client 160 may be used to administer an electronic mail messaging system with two different inboxes. One of the inboxes may include electronic mail messages associated with valid stamps. The other inbox may include electronic mail messages not associated with valid stamps, which may include messages associated with invalid stamps or electronic mail messages not associated with a stamp.

The receiving client 160 may be used to specify preferences in receiving electronic mail messages. Thus, the receiving client 160 may be configured to reject (not store or process) any electronic mail messages unless the user administering the receiving client 160 has previously transmitted an electronic mail message to the party sending the unstamped electronic mail message.

Figure 2:
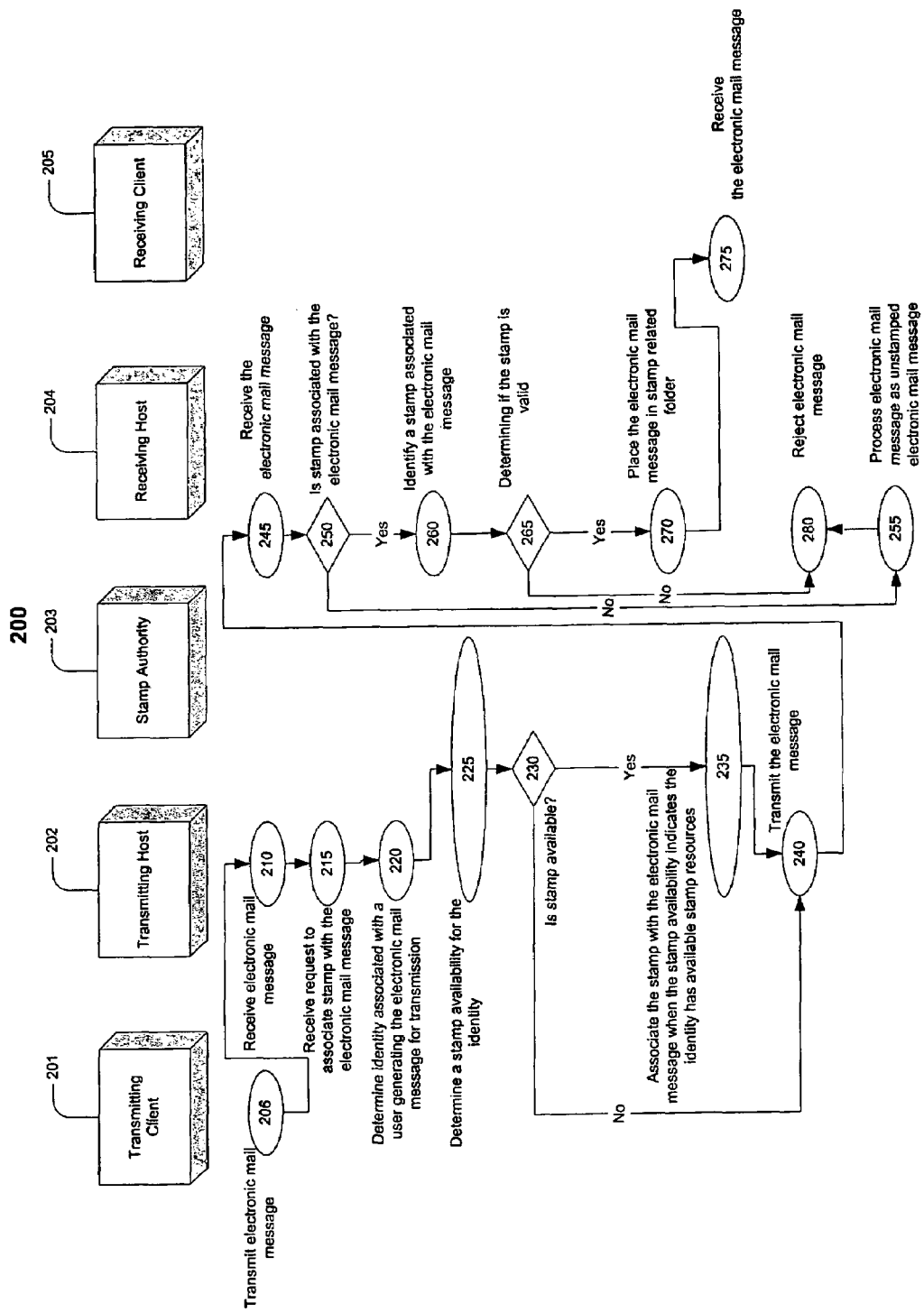
FIG. 2 is a flow chart illustrating an exemplary process by which a stamp authority may be used to process an electronic mail message.

Referring to FIG. 2, a flow chart 200 illustrates an exemplary process by which a stamp authority may be used to process an electronic mail message. Particular components described with respect to FIG. 1 may perform the process 200. However, similar methodologies may be applied in other implementations where different components are used to define the structure of the system, or where the functionality is distributed differently among the components shown by FIG. 1.

Initially, a transmitting client 201 transmits an electronic mail message (206). For example, the transmitting client 201 may use an electronic mail messaging application to generate a message window, use an address book to specify a recipient, and click a 'send message' button to transmit the electronic mail message.

A transmitting host 202 receives the electronic mail message (210). The transmitting host 202 also receives a request to associate a stamp with the electronic mail message (215). Receiving the request does not require that a user select an "insert stamp" button that generates an automated request. In response to the request, the transmitting host may poll the stamp authority 140 to determine if a stamp may be associated with the electronic mail message.

The transmitting host 202 determines the identity associated with a user generating the message for transmission (220) and the stamp availability for the identity (225). For example, the transmitting host 202 may use the sending address for an electronic mail message and may communicate with a stamp authority 203 to determine whether the account associated with the sending address is allowed to associate stamps with an electronic mail message. In one example, the stamp authority 203 determines whether a counter tracking the number of electronic mail messages that may be exchanged indicates that the identity has stamps available to use. In another example, the stamp authority 203 meters stamps based on the amount of the content exchanged in the electronic mail message. Thus, an identity may be allowed to send a specified amount of content (as measured in megabytes), irrespective of the number of messages across which the content is distributed. Thus, an electronic mail message that consumes more memory (e.g., a video file generally consumes more memory than a plain text message) would reduce the amount of messages the identity may send.

The stamp authority may meter the content using a combination of the message count and file size considerations. For example, an identity may be allowed to transmit a specified number of electronic mail messages per period of time, where the electronic mail messages are less than a predetermined size. Additional stamps or costs may be incurred if the identity is transmitting a larger amount of content in the electronic mail message. In one example, the number of stamps available to the identity may be reduced based on the size of a message sent. In another example, the identity incurs additional financial costs to process the electronic mail message with the larger amount of content.

When there is a stamp available (230), a stamp is associated with the electronic mail message (235). In one example, associating the stamp with the electronic mail message includes modifying or appending stamp information into the electronic mail message. In another example, associating the stamp with the electronic mail message records a message identifier at the stamp authority 203. Recording the message identifier may include recording an indication of a stamp that was associated, a message number or hash, the identity of the addressees, the time and date of the electronic mail message, and/or other information used to identify electronic mail message.

With or without an associated stamp, the transmitting host 202 transmits the electronic mail message (240) to a receiving host 204, which receives the electronic mail message (245). The receiving host 204 determines if there is a stamp associated with the electronic mail message (250).

If there is not a stamp associated with the electronic mail message, the receiving host 204 processes the electronic mail message as an unstamped electronic mail message (255). Processing the electronic mail message as an unstamped electronic mail message may include rejecting the electronic mail message (280), storing the electronic mail message as an unstamped folder (not shown), or performing additional processing to better determine if the electronic mail message is unsolicited (not shown). Generally, an electronic mail message is unsolicited if there is no prior relationship between the transmitting user and the receiving user. Rejecting the electronic mail message may include transmitting an electronic mail message in reply indicating that the receiving host 204, a receiving client 205, or the receiving user does not accept unstamped electronic mail messages. The response messages may include a code segment (e.g., an HTML link) allowing a stamp to be associated in a retransmission, or allowing the transmitting user to purchase a stamp.

If a stamp is associated with the electronic mail message, it is identified (260). In one example, identifying a stamp associated with the electronic mail message includes reading a stamp included in or appended to the electronic mail message. The stamp may include a label used to identify a transaction on the stamp authority 203. The label may be used to retrieve additional information. In another example, the stamp is not included in or appended to an electronic mail message. Instead, the receiving host 204 may reference a message number or a transmitting address used to transmit both stamped and unstamped electronic mail messages to access the stamp stored on a stamp authority 140. The message number may be used to retrieve a stamp used to transmit the electronic mail message.

The receiving host 204 determines if the stamp is valid (265). Determining if the stamp is valid generally includes determining if an accredited stamp was used and consumed in transmitting the electronic mail message. Determining if the stamp is valid may include determining if the stamp was previously used, determining if an accredited authority issued the stamp, determining that adequate stamp resources were expended to transmit the message (e.g., to support larger file sizes), determining that the transmitting party had adequate stamps to transmit the electronic mail message, and/or determining that fraud was not used in associating a stamp and sending the electronic mail message.

When the stamp is deemed valid (265), the receiving host 204 places the electronic mail message in a stamp-related folder in an inbox (270). The receiving client 205 then may receive the electronic mail message (275). When the stamp is invalid, the electronic mail message may be rejected (280).

Although determining the stamp validity is shown as being performed by the receiving host 204, determining the stamp validity also may be performed by other devices, such as the stamp authority 203 or the receiving client 205. Furthermore, although flow chart 200 illustrates the transmitting host 202 associating a stamp with the electronic mail messages, the stamp may be associated by other devices (e.g., the transmitting client 201) and in other manners (e.g., as the message is being transmitted from the transmitting client 201).

Moreover, other implementations are within the scope of the following claims. For example, the stamps may be used per recipient or per message (where a message includes multiple recipients). And, although the systems and operations were described with respect to electronic mail messages, other messaging systems and operations may be used. For example, a stamp authority may be used in exchanging instant messages, wireless telephone messages (e.g., Short Message Service (SMS), MMS (Multimedia Message Service)), flash messages, or other messaging formats.

There may be more than one type of stamp. In addition to varying the type of stamp with the type or size of content exchanged, the stamp type also may be varied to offer tiered or differentiated services. For example, a first stamp type may indicate that reimbursement takes place immediately upon processing the electronic mail message while a second stamp type indicates that reimbursement takes place after a balance of payments has been determined to account for a creditor/debtor status based on the aggregate of messages exchanged.

Other types of stamps may be associated with a particular stamp authority. For example, one class of stamps may be associated with a trusted provider while another class of stamps may be associated with a stamp authority that is frequently used by mass e-mailers (e.g., spammers) or with a reputation of not rigorously administering the stamping system.

The receiving host and/or receiving client may use the type of stamp in deciding whether or how to process an electronic mail message. For example, a receiving host may reject electronic mail messages from a stamp authority that has been identified or associated with mass e-mailers or issuing too many stamps. In another example, a receiving client may route stamped electronic mail messages from disreputable stamp providers into an unstamped or SPAM folder. Other examples may feature different folders or triggering criteria associated with an electronic mail message. For example, a service provider acting as a stamp authority may offer three tiers of stamps. The first tier of stamps may feature a basic level of service that allows the sent electronic mail message to be placed in a 'stamped' inbox. The second tier of stamps may offer one or more premium features. The premium features may route the electronic mail message to a higher priority folder, or include specific delivery options. In a first example, the specific delivery options may be used to confirm receipt of the electronic mail message. In a second example, the second-tier electronic mail message may be routed to an administrative assistant specified by the recipient that will receive a copy of the electronic mail message. A third tier of stamps may feature robust delivery options. For example, the electronic mail message may be forwarded to additional devices associated with the intended recipient such as a wireless phone or pager, or other electronic mail message accounts associated with the intended recipient. Thus, a transmitting user may pay a premium to forward the electronic mail message to a user who is on vacation but accessing a special account to receive priority electronic mail messages. In another example, rejected third tier messages are forwarded to a human operator that attempts to work with an administrator for the receiving system to resolve delivery issues.

What is claimed is:

1. A computer-implemented method of processing electronic messages using a stamp authority, the method comprising:

receiving, from a sender, a first electronic message that is associated with a stamp and that is addressed to a user, wherein associating the stamp with the first electronic message imposes an additional transaction cost, borne by the sender, for sending the first electronic message and appends, to the first electronic message, non-display stamp information that enables determination of whether the stamp associated with the first electronic message is valid;

receiving, from the sender, a second electronic message that is not associated with a stamp and that is addressed to the user, wherein sending the second electronic message that is not associated with a stamp does not impose the additional transaction cost, borne by the sender, for sending the second electronic message;

identifying the non-display stamp information appended to the first electronic message;

determining whether the stamp associated with the first electronic message is valid based on the identified non-display stamp information;

determining whether the second electronic message is associated with a stamp; and based on a determination that the stamp associated with the first electronic message is valid and a determination that the second electronic message is not associated with a stamp:

causing a user interface that is configured to display representations of electronic messages received by the user to display, in the user interface, a first representation of the first electronic message that is associated with a valid stamp, causing the user interface to display, in the user interface, a second representation of the second electronic message that is not associated with a stamp, and causing the user interface to visually distinguish, in the user interface, the displayed first representation from the displayed second representation based on the determination that the first electronic message is associated with a valid stamp and the determination that second electronic message is not associated with a stamp.

2. The method of claim 1 wherein receiving the first electronic message includes receiving a first message with communications intended for receipt by a user and a second message with the stamp that is associated with the first message, wherein the first message and the second message are separate and distinct communications.

3. The method of claim 1 wherein receiving the first electronic message includes receiving the first electronic message with the stamp included in the first electronic message.

4. The method of claim 1 wherein determining whether the stamp associated with the first electronic message is valid based on the identified non-display stamp information includes performing a cryptographic operation to authenticate the identified non-display stamp information with a key management system.

5. The method of claim 1 wherein determining whether the stamp is valid includes determining whether the stamp has been used previously.

6. The method of claim 1 further comprising executing a stamp transaction indicating the stamp has been used.

7. The method of claim 6 wherein executing the stamp transaction includes canceling the stamp from being used in the future.

8. The method of claim 6 wherein executing the stamp transaction includes adjusting a counter indicating a number of times the stamp may be used.

9. The method of claim 1 wherein:
the first electronic message was electronically associated with the stamp by a stamp authority system;
receiving the first electronic message comprises receiving the first electronic message by a receiving system that is different than the stamp authority system; and
determining whether the stamp associated with the first electronic message is valid based on the identified non-display stamp information includes polling, by the receiving system, the stamp authority system to determine whether the stamp was validly issued by the stamp authority system.

10. The method of claim 1 further comprising:
placing the first electronic message in a first folder in the user interface based on the determination that the first electronic message is associated with a valid stamp and placing the second electronic message in a second folder in the user interface that is different than the first folder based on the determination that second electronic message is not associated with a stamp.

11. The method of claim 10 wherein placing the first electronic message in the first folder in the user interface and placing the second electronic message in the second folder in the user interface that is different than the first folder comprises placing the first electronic message in the user's inbox and placing the second electronic message in an unsolicited message folder.

12. The method of claim 1 further comprising:
based on a determination that the stamp associated with the first electronic message is invalid, sending a response message indicating that the first electronic message was rejected because it was not validly stamped, the response message including a link that is configured to, upon user selection, allow a stamp to be associated with the first electronic message in a retransmission of the first electronic message.

13. The method of claim 1 further comprising:
receiving, from the sender, a third electronic message that is associated with a stamp and that is addressed to the user, wherein associating the stamp with the third electronic message imposes an additional transaction cost, borne by the sender, for sending the third electronic message and appends, to the third electronic message, non-display stamp information that enables determination of whether the stamp associated with the third electronic message is valid;
identifying the non-display stamp information appended to the third electronic message;
determining whether the stamp associated with the third electronic message is valid based on the non-display stamp information appended to the third electronic message;
based on a determination that the stamp associated with the first electronic message is valid and a determination that the stamp associated with the third electronic message is invalid:
causing the user to display, in the user interface, the first representation of the first electronic message that is associated with a valid stamp,
causing the user interface to display, in the user interface, a third representation of the third electronic message that is associated with an invalid stamp, and
causing the user interface to visually distinguish, in the user interface, the displayed first representation from the displayed third representation based on the determination that the first electronic message is associated with a valid stamp and the determination that third electronic message is associated with an invalid stamp.

14. The method of claim 1 further comprising:
based on a determination that the stamp associated with the first electronic message is valid, determining, from among multiple tiers of stamps, a tier of the stamp associated with the first electronic message, wherein each of the multiple tiers of stamps results in a different level of service in processing of the first electronic message by a receiving system.

15. The method of claim 14 wherein the multiple tiers of stamps include:
a first tier of stamps that results in the first electronic message being placed, by the receiving system, in a folder for stamped messages;
a second tier of stamps that results in at least one of the first electronic message being placed, by the receiving system, in a higher priority folder that is different than the folder for stamped messages, a confirmation receipt for the first electronic message being transmitted by the receiving system, and a copy of the first electronic message being routed, by the receiving system, to an administrative assistant of the recipient of the first electronic message; and
a third tier of stamps that results in at least one of the first electronic message being forwarded, by the receiving system, to one or more additional devices of the recipient of the first electronic message, the first electronic message being forwarded, by the receiving system, to one or more additional messaging accounts of the recipient of the first electronic message, and the first electronic message being forwarded to a human operator in response to the first electronic message being rejected.

16. The method of claim 15 wherein the second tier of stamps results in the first electronic message being placed, by the receiving system, in a higher priority folder that is different than the folder for stamped messages, and the third tier of stamps results in the first electronic message being forwarded, by the receiving system, to one or more additional devices of the recipient of the first electronic message, further comprising:

in response to determining that the tier of the stamp associated with the first electronic message is the first tier, placing, by the receiving system, the first electronic message in the folder for stamped messages;

in response to determining that the tier of the stamp associated with the first electronic message is the second tier, placing, by the receiving system, the first electronic message in higher priority folder that is different than the folder for stamped messages; and in response to determining that the tier of the stamp associated with the first electronic message is the third tier, forwarding, by the receiving system, the first electronic message to one or more additional devices of the recipient of the first electronic message.

17. The method of claim 15 wherein the second tier of stamps results in the first electronic message being placed, by the receiving system, in a higher priority folder that is different than the folder for stamped messages, and the third tier of stamps results in the first electronic message being forwarded, by the receiving system, to one or more additional messaging accounts of the recipient of the first electronic message, further comprising:

in response to determining that the tier of the stamp associated with the first electronic message is the first tier, placing, by the receiving system, the first electronic message in the folder for stamped messages;

in response to determining that the tier of the stamp associated with the first electronic message is the second tier, placing, by the receiving system, the first electronic message in higher priority folder that is different than the folder for stamped messages; and in response to determining that the tier of the stamp associated with the first electronic message is the third tier, forwarding, by the receiving system, the first electronic message to one or more additional messaging accounts of the recipient of the first electronic message.

18. The method of claim 15 wherein the second tier of stamps results in the first electronic message being placed, by the receiving system, in a higher priority folder that is different than the folder for stamped messages, and the third tier of stamps results in the first electronic message being forwarded to a human operator in response to the first electronic message being rejected, further comprising:

in response to determining that the tier of the stamp associated with the first electronic message is the first tier, placing, by the receiving system, the first electronic message in the folder for stamped messages;

in response to determining that the tier of the stamp associated with the first electronic message is the second tier, placing, by the receiving system, the first electronic message in higher priority folder that is different than the folder for stamped messages; and in response to determining that the tier of the stamp associated with the first electronic message is the third tier, forwarding, by the receiving system, the first electronic message to a human operator in response to the first electronic message being rejected.

19. The method of claim 15 wherein the second tier of stamps results in a confirmation receipt for the first electronic message being transmitted by the receiving system, and the third tier of stamps results in the first electronic message being forwarded, by the receiving system, to one or more additional devices of the recipient of the first electronic message, further comprising:

in response to determining that the tier of the stamp associated with the first electronic message is the first tier, placing, by the receiving system, the first electronic message in the folder for stamped messages;

in response to determining that the tier of the stamp associated with the first electronic message is the second tier, transmitting, by the receiving system, a confirmation receipt for the first electronic message; and in response to determining that the tier of the stamp associated with the first electronic message is the third tier, forwarding, by the receiving system, the first electronic message to one or more additional devices of the recipient of the first electronic message.

20. The method of claim 15 wherein the second tier of stamps results in a confirmation receipt for the first electronic message being transmitted by the receiving system, and the third tier of stamps results in the first electronic message being forwarded, by the receiving system, to one or more additional messaging accounts of the recipient of the first electronic message, further comprising:

in response to determining that the tier of the stamp associated with the first electronic message is the first tier, placing, by the receiving system, the first electronic message in the folder for stamped messages;

in response to determining that the tier of the stamp associated with the first electronic message is the second tier, transmitting, by the receiving system, a confirmation receipt for the first electronic message; and in response to determining that the tier of the stamp associated with the first electronic message is the third tier, forwarding, by the receiving system, the first electronic message to one or more additional messaging accounts of the recipient of the first electronic message.

21. The method of claim 15 wherein the second tier of stamps results in a confirmation receipt for the first electronic message being transmitted by the receiving system, and the third tier of stamps results in the first electronic message being forwarded to a human operator in response to the first electronic message being rejected, further comprising:

in response to determining that the tier of the stamp associated with the first electronic message is the first tier, placing, by the receiving system, the first electronic message in the folder for stamped messages;

in response to determining that the tier of the stamp associated with the first electronic message is the second tier, transmitting, by the receiving system, a confirmation receipt for the first electronic message; and in response to determining that the tier of the stamp associated with the first electronic message is the third tier, forwarding, by the receiving system, the first electronic message to a human operator in response to the first electronic message being rejected.

22. The method of claim 15 wherein the second tier of stamps results in a copy of the first electronic message being routed, by the receiving system, to an administrative assistant of the recipient of the first electronic message, and the third tier of stamps results in the first electronic message being forwarded, by the receiving system, to one or more additional devices of the recipient of the first electronic message, further comprising:

in response to determining that the tier of the stamp associated with the first electronic message is the first tier, placing, by the receiving system, the first electronic message in the folder for stamped messages;

in response to determining that the tier of the stamp associated with the first electronic message is the second tier, routing, by the receiving system, a copy of the first electronic message to an administrative assistant of the recipient of the first electronic message; and in response to determining that the tier of the stamp associated with the first electronic message is the third tier, forwarding, by the receiving system, the first electronic message to one or more additional devices of the recipient of the first electronic message.

23. The method of claim 15 wherein the second tier of stamps results in a copy of the first electronic message being routed, by the receiving system, to an administrative assistant of the recipient of the first electronic message, and the third tier of stamps results in the first electronic message being forwarded, by the receiving system, to one or more additional messaging accounts of the recipient of the first electronic message, further comprising:

in response to determining that the tier of the stamp associated with the first electronic message is the first tier, placing, by the receiving system, the first electronic message in the folder for stamped messages;

in response to determining that the tier of the stamp associated with the first electronic message is the second tier, routing, by the receiving system, a copy of the first electronic message to an administrative assistant of the recipient of the first electronic message; and in response to determining that the tier of the stamp associated with the first electronic message is the third tier, forwarding, by the receiving system, the first electronic message to one or more additional messaging accounts of the recipient of the first electronic message.

24. The method of claim 15 wherein the second tier of stamps results in a copy of the first electronic message being routed, by the receiving system, to an administrative assistant of the recipient of the first electronic message, and the third tier of stamps results in the first electronic message being forwarded to a human operator in response to the first electronic message being rejected, further comprising:

in response to determining that the tier of the stamp associated with the first electronic message is the first tier, placing, by the receiving system, the first electronic message in the folder for stamped messages;

in response to determining that the tier of the stamp associated with the first electronic message is the second tier, routing, by the receiving system, a copy of the first electronic message to an administrative assistant of the recipient of the first electronic message; and in response to determining that the tier of the stamp associated with the first electronic message is the third tier, forwarding, by the receiving system, the first electronic message to a human operator in response to the first electronic message being rejected.

25. A computer-readable storage medium storing instructions that, when executed by a processor, perform operations comprising:

receiving, from a sender, a first electronic message that is associated with a stamp and that is addressed to a user, wherein associating the stamp with the first electronic message imposes an additional transaction cost, borne by the sender, for sending the first electronic message and appends, to the first electronic message, non-display stamp information that enables determination of whether the stamp associated with the first electronic message is valid;

receiving, from the sender, a second electronic message that is not associated with a stamp and that is addressed to the user, wherein sending the second electronic message that is not associated with a stamp does not impose the additional transaction cost, borne by the sender, for sending the second electronic message;

identifying the non-display stamp information appended to the first electronic message;

determining whether the stamp associated with the first electronic message is valid based on the identified non-display stamp information;

determining whether the second electronic message is associated with a stamp; and based on a determination that the stamp associated with the first electronic message is valid and a determination that the second electronic message is not associated with a stamp:

causing a user interface that is configured to display representations of electronic messages received by the user to display, in the user interface, a first representation of the first electronic message that is associated with a valid stamp, causing the user interface to display, in the user interface, a second representation of the second electronic message that is not associated with a stamp, and causing the user interface to visually distinguish, in the user interface, the displayed first representation from the displayed second representation based on the determination that the first electronic message is associated with a valid stamp and the determination that second electronic message is not associated with a stamp.

26. A computer system configured to process electronic messages using a stamp authority, the computer system comprising:

means for receiving, from a sender, a first electronic message that is associated with a stamp and that is addressed to a user, wherein associating the stamp with the first electronic message imposes an additional transaction cost, borne by the sender, for sending the first electronic message and appends, to the first electronic message, non-display stamp information that enables determination of whether the stamp associated with the first electronic message is valid;

means for receiving, from the sender, a second electronic message that is not associated with a stamp and that is addressed to the user, wherein sending the second electronic message that is not associated with a stamp does not impose the additional transaction cost, borne by the sender, for sending the second electronic message;

means for identifying the non-display stamp information appended to the first electronic message;

means for determining whether the stamp associated with the first electronic message is valid based on the identified non-display stamp information;

means for determining whether the second electronic message is associated with a stamp; and means for based on a determination that the stamp associated with the first electronic message is valid and a determination that the second electronic message is not associated with a stamp:

causing a user interface that is configured to display representations of electronic messages received by the user to display, in the user interface, a first representation of the first electronic message that is associated with a valid stamp, causing the user interface to display, in the user interface, a second representation of the second electronic message that is not associated with a stamp, and causing the user interface to visually distinguish, in the user interface, the displayed first representation from the displayed second representation based on the determination that the first electronic message is associated with a valid stamp and the determination that second electronic message is not associated with a stamp.

\* \* \* \* \*